(12) United States Patent
Hedin et al.

(10) Patent No.: US 7,314,412 B2
(45) Date of Patent: Jan. 1, 2008

(54) AMUSEMENT DEVICE SHARED RESOURCE SYSTEM AND METHOD

(75) Inventors: Dean Hedin, Hatboro, PA (US); Malcolm J. Harwood, Bensalem, PA (US)

(73) Assignee: Merit Industries, Inc., Bensalem, PA (US)

( * ) Notice: Subject to any disclaimer, the term of this patent is extended or adjusted under 35 U.S.C. 154(b) by 517 days.

(21) Appl. No.: 10/663,456

(22) Filed: Sep. 16, 2003

(65) Prior Publication Data

US 2005/0059492 A1    Mar. 17, 2005

(51) Int. Cl.
*A63F 13/00* (2006.01)

(52) U.S. Cl. .......................................... 463/29; 463/42
(58) Field of Classification Search ................... 463/42
See application file for complete search history.

(56) References Cited

U.S. PATENT DOCUMENTS

| | | | |
|---|---|---|---|
| 4,856,787 A * | 8/1989 | Itkis ........................... | 273/237 |
| 5,341,350 A | 8/1994 | Frank et al. | |
| 5,575,717 A * | 11/1996 | Houriet et al. ................. | 463/1 |
| 5,743,799 A * | 4/1998 | Houriet et al. ................ | 463/25 |
| 5,797,795 A * | 8/1998 | Takemoto et al. ............ | 463/42 |
| 6,195,436 B1 | 2/2001 | Scibora et al. | |
| 6,397,189 B1 | 5/2002 | Martin et al. | |
| 6,430,537 B1 | 8/2002 | Tedesco et al. | |
| 6,755,744 B1 | 6/2004 | Nathan et al. | |
| 2002/0002079 A1 | 1/2002 | Martin et al. | |
| 2002/0085024 A1 | 7/2002 | White et al. | |
| 2002/0111825 A1 | 8/2002 | Martin et al. | |
| 2003/0031096 A1 | 2/2003 | Nathan et al. | |
| 2003/0046557 A1 | 3/2003 | Miller et al. | |
| 2003/0176213 A1 * | 9/2003 | LeMay et al. ................ | 463/20 |
| 2004/0002375 A1 * | 1/2004 | Ogawa ........................ | 463/20 |

FOREIGN PATENT DOCUMENTS

| | | |
|---|---|---|
| GB | 2 371 670 A | 7/2002 |
| WO | WO 02/25610 A1 | 3/2002 |

* cited by examiner

*Primary Examiner*—John M. Hotaling, II
(74) *Attorney, Agent, or Firm*—Akin Gump Strauss Hauer & Feld LLP

(57) ABSTRACT

An amusement device system includes a first amusement device having a controller and a memory, a shared resource device operatively connected to the first amusement device and a second amusement device having a controller and a memory. The second amusement device is in communication with the first amusement device and is configured to access and control the shared resource device through the first amusement device.

15 Claims, 5 Drawing Sheets

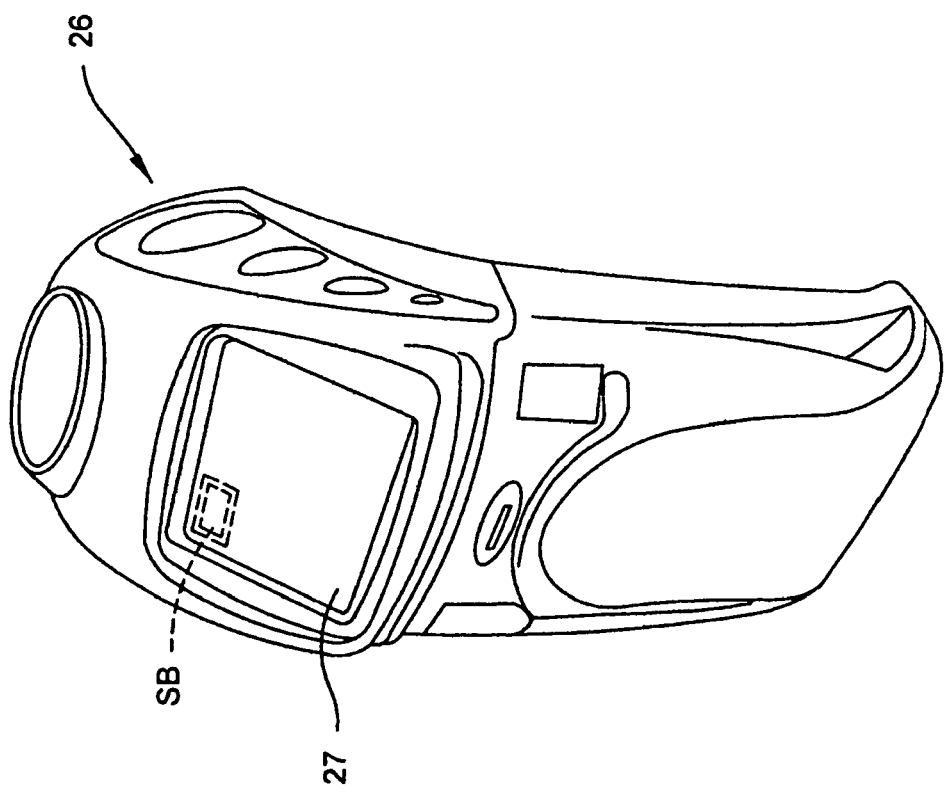
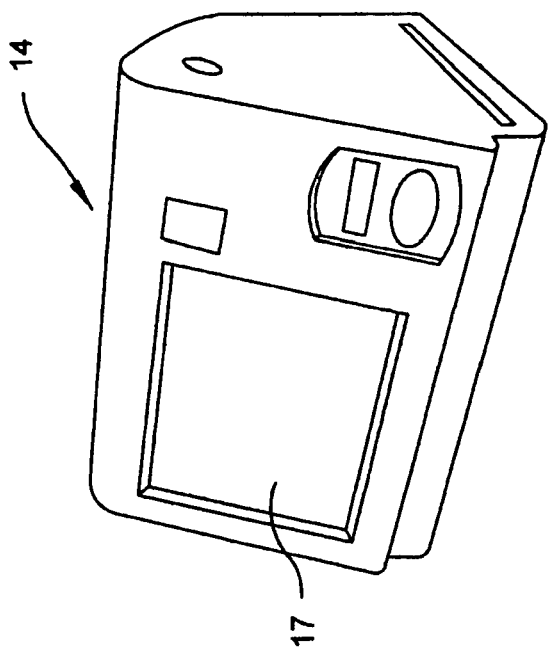

AMUSEMENT DEVICE SHARED RESOURCE SYSTEM AND METHOD

BACKGROUND OF THE INVENTION

The present invention relates generally to an amusement device sharing system and, more particularly, relates to an amusement device shared resource system for sharing a shared resource device between a plurality of amusement devices. Amusement devices, such as game machines, which allow a user to select games from a video display are well known in the art such as those disclosed in U.S. Pat. No. 4,856,787 (Itkis); U.S. Pat. No. 5,575,717 (Houriet, Jr. et al.); U.S. Pat. No. 5,743,799 (Houriet, Jr. et al.), the contents of which are incorporated by reference herein, each of which shows a touchscreen display for making a game selection from a menu of games. Such game machines or amusement devices typically operate upon input of currency (i.e., coin, token, paper money, credit/debit cards and the like) and are installed in bars, restaurants, airports, shopping malls, video arcades and the like. The game choices may include card games, sports games, games of skill, games of chance, action games, trivia games and the like.

In some instances, such games are configured to be played either against another competitor or in a competition or tournament. In more advanced systems, the games machines are connected either peer to peer by a direct cable connection or on a hardwired network, such as a hardwired local area network (LAN), allowing a player at one game machine to play against a competitor at a different game machine or to participate in a competition or tournament that tracks players at a plurality of game machines and possibly at a plurality of locations.

Often, such game machine systems installed in one location or a location with multiple areas, floors or rooms requires that network cabling or other network communication systems, in addition to the power supply cabling, be run between game machines and/or to network hubs, routers, modems and/or gateways and the like.

What is needed but not presently provided by the prior art devices is an amusement device system capable of sharing a resource over a communication system.

BRIEF SUMMARY OF THE INVENTION

Briefly stated, the present invention comprises an amusement device system including a first amusement device having a controller and a memory, a shared resource device operatively connected to the first amusement device and a second amusement device having a controller and a memory. The second amusement device is in communication with the first amusement device and is configured to access and control the shared resource device through the first amusement device. The present invention also comprises a method of controlling a shared resource in a network system of amusement devices. The network system includes at least a first amusement device having a controller and a memory, a shared resource device operatively connected to the first amusement device and a second amusement device having a controller and a memory. The second amusement device is in communication with the first amusement device and is configured to access and control the shared resource device through the first amusement device. The method includes using the second amusement device controller to make a request that the first amusement device controller run a terminal server software application. The terminal server software application is configured to accept commands to control the inputs/outputs (I/O) of the first amusement device controller. The method further includes controlling the shared resource device using the second amusement device controller by commanding the I/O of the first amusement device using the terminal server application.

In another aspect, the present invention comprises an amusement device system including a first amusement device having a controller and a memory, a shared resource device operatively connected to the first amusement device and a second amusement device having a controller and a memory. The controller of the first amusement device is configured to run a terminal server software application and the terminal server application is configured to accept commands to control the I/O of the first amusement device controller. The second amusement device is in communication with the first amusement device and is configured to access and control the shared resource device through the first amusement device. The first amusement device controller is configured to run terminal server application upon the request of the second amusement device controller. The second amusement device controller thereby controls the shared resource device by commanding the I/O of the first amusement device using the terminal server application and all data processing for controlling the shared resource while the terminal server application is running and occurs in the second amusement device controller and memory.

In yet another aspect, the present invention is an amusement device system comprising a first amusement device having a controller and a memory, a first shared resource device operatively connected to the first amusement device and a second amusement device having a controller and a memory. The second amusement device is in communication with the first amusement device and is configured to access and control the first shared resource device through the first amusement device. The amusement device system also includes a second shared resource device operatively connected to the second amusement device. The first amusement device is in communication with the second amusement device and is configured to access and control the second shared resource device through the second amusement device.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a perspective view of an exemplary video jukebox for use with the first preferred embodiment shown in FIG. 1;

FIG. 5 is a perspective view of an exemplary amusement device for use with the preferred embodiments shown in FIGS. 1-3.

DETAILED DESCRIPTION OF THE INVENTION

Figure 1:
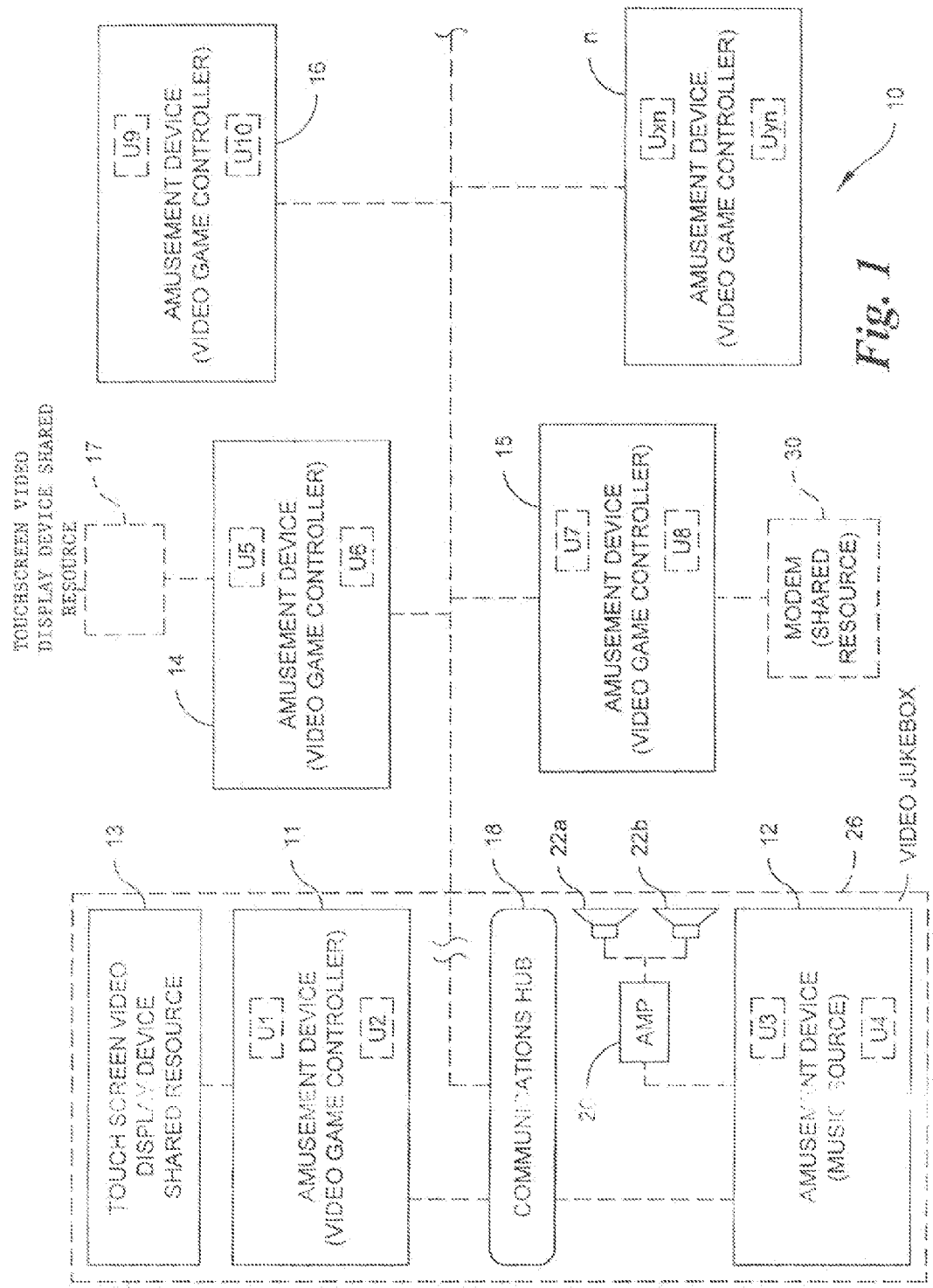
FIG. 1 is a block diagram of an amusement device shared resource system in accordance with the first preferred embodiment of the present invention.

In the drawings, like numerals are used to indicate like elements throughout. Referring to the drawings in detail, FIG. 1 shows a first preferred embodiment of an amusement device shared resource system 10 in accordance with the present invention. The amusement device system includes a first amusement device 11 having a controller U1 and a memory U2. The amusement device system 10 further includes a shared resource device 13 such a touchscreen video display device type shared resource which is operatively connected to the first amusement device 11. The amusement device system further includes a second amusement device 12 also having a controller U3 and a memory U4. The second amusement device 12 is in communication with the first amusement device and is configured to access and control the shared resource device 13 through the first amusement device 11. While described in this example as being a touchscreen video display device type shared resource 13, the shared resource 13 can be any one of a modem, a printer, a currency accepter, a magnetic card reader, a video display or other input device. Other input devices which may be a shared resource device 13 include a trac-ball, a mouse, a voice recognition system, a keypad, a keyboard and the like.

The system includes a first amusement device 11, which in the present case is a video game controller having a touchscreen video display device shared resource. The first amusement device 11 may include a plurality of games selectable from a menu. A number of different games may therefore be played on the first amusement device 11. The games may be stored in memory of the first amusement device 11 to be accassed when a menu is selected. The touchscreen video display device 13 is directly connected to the first amusement device 11. The amusement device shared resource system 10 further includes a communications hub 18 such as an Ethernet hub or switch and a second amusement device 12. The second amusement device 12, which in the present case is a music source such as a "digital jukebox." The first amusement device 11 is a stand-alone computer system having a microprocessor U1, a memory U2, a communications driver (not labeled) and touchscreen video (not labeled) display driver (not labeled). Likewise, the second amusement device 12 is also a stand-alone computer system having a microprocessor U3, a memory U5 and a communications driver (not labeled). The second amusement device 12 does not have its own video display device or any other input device. As configured, the touchscreen display video device shared resource 13 is directly attached to first amusement device 11 and is configured to be accessed by the second amusement device 12 through the communications hub 18. For example, the touchscreen video display device shared resource 13 includes a screen 18 (FIG. 4) having an access software button SB to the second amusement device 12 such that when a user presses the access software button SB, a terminal server (or "term serv") software application is initiated on both the first amusement device 11 and the second amusement device 12. The second amusement device 12 then functions as a master controller to the first amusement device 11 taking over the shared resource 13 in this case, the touchscreen video display device shared resource 13. The user can then access all the features and functionality of the second amusement device 12 through the touchscreen video display shared resource 13 that is physically and electrically connected directly to the first amusement device 11. The first amusement device 11 in this embodiment functions as a "dumb terminal" or pass-through device, and the second amusement device 12 acts as the master. As shown, the first amusement device 11 (the video game controller), the second amusement device 12 (the music source), the touchscreen video display device shared resource 13 and the communications hub 18 are all disposed in a single housing forming a video jukebox 26 (FIG. 4). It is transparent to the user that there are first and second amusement devices 11, 12 installed within the video jukebox apparatus 26. However, the communications hub 18 need not be a separate device external to the first and second amusement devices 11, 12, but instead may merely be an additional communications port (i.e., a gateway) in either the first or second amusement device 11, 12.

In an alternate of the embodiment of FIG. 1, the communications hub provides a network to a plurality of amusement devices 14, 15, 16, n each having their own dedicated touchscreen video display device shared resource 17 (phantom in FIG. 1 with amusement device 14), such as shown with amusement device 14 in FIG. 5, which allows access to the second amusement device 12 via the communications hub 18 as described above regarding the first amusement device 11. Thus, a user in a location that is remote from the video jukebox 26 can use the touchscreen video display device shared resource 13. For example, a user in one end of a building using the touchscreen video display device shared resource 17 of the third amusement device 14 can access the second amusement device 12 (the music source) and use the functions of the second amusement device 12 which is located at another end of the building or on a separate floor in the building. The second amusement device 12 (the music source) may have a large capacity of stored music files such as MP3 files and the like, and the second amusement device 12 can be directly connected to an audio amplifier 20 and speakers 22a, 22b. Thus, a user can select one of the music files to play on the second amusement device 12 from any of the amusement devices 11, 14, 15, 16 and n to the audio amplifier 20.

In another alternate of the first preferred embodiment, the amusement device system 10 also includes a second shared resource device 17 operatively connected to the third amusement device 14. The second amusement device 12 is in communication with the third amusement device 14 and is configured to access and control the second shared resource device 17 through the third amusement device 14. Additionally, the amusement device system 10 also includes a third amusement device shared resource 30 (phantom in FIG. 1 connected to the fourth amusement device 15), or in this case a modem shared resource device 30. The fourth amusement device 15 is in communication with the first, second and third amusement devices 11, 12 and 14 and the first, second and third amusement devices 11, 12 and 14 are also in communication with each other. The first amusement device 11 can access and control the modem shared resource 30 through the third amusement device while simultaneously the second amusement device 12 can access the first or second amusement device shared resource 13, 17. Obviously, any combination of shared resource devices 13, 17, 30 may be linked to any number of amusement devices 11, 12, 14, 15, 16, n. Further, it is contemplated that a single amusement device 11, 12, 14, 15, 16, or n may include a plurality of shared resource devices 13, 17, 30 which are individually or in combination selectively accessed by another or a plurality of other amusement devices 11, 12, 14, 15, 16.

Figure 2:
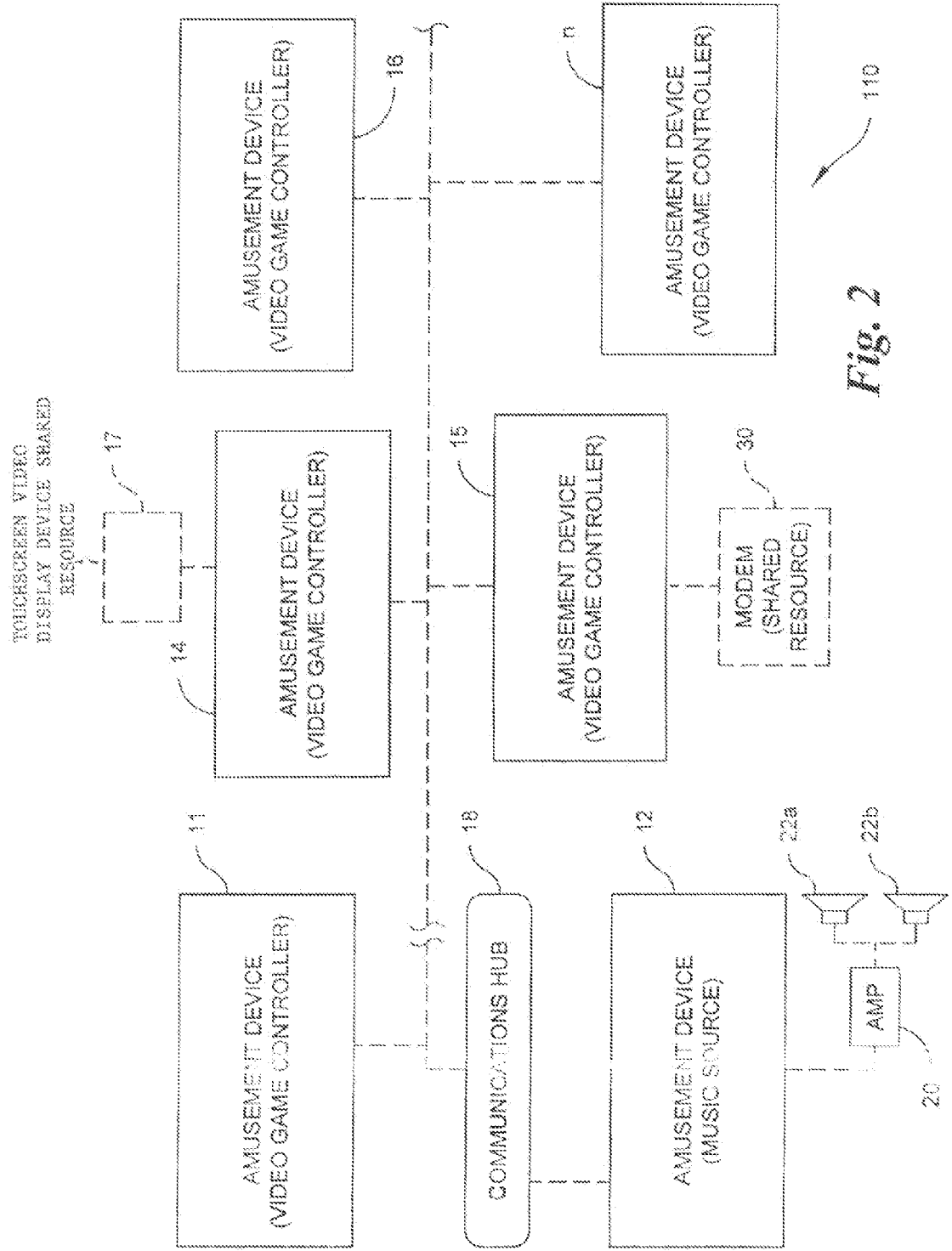
FIG. 2 is a block diagram of an amusement device shared resource system in accordance with a second preferred embodiment of the present invention.

FIG. 2 shows a second preferred embodiment of an amusement device shared resource system 110 wherein the second amusement device 12 (the music source) is a separate, standalone entity remotely mounted away from the first amusement device 11 (a video game controller). Similar to the embodiment described above in FIG. 1, any of the Amusement Devices Nos. 1 and 3-n can access the second amusement device 12 (the music source) via the communications hub 18. The communications platform connecting the amusement devices 11, 14, 15, 16 and n may be Ethernet, wireless (RF, IR, etc.), power line, superimposed telephone line, and the like. Similar to the first preferred embodiment, any combination of shared resource devices 13, 17, 30 may be linked to any number of amusement devices 11, 12, 14, 15, 16, n. Further, it is contemplated that a single amusement device 11, 12, 14, 15, 16, or n may include a plurality of shared resource devices 13, 17, 30 which are individually or in combination selectively accessed by another or a plurality of other amusement devices 11, 12, 14, 15, 16.

Figure 3:
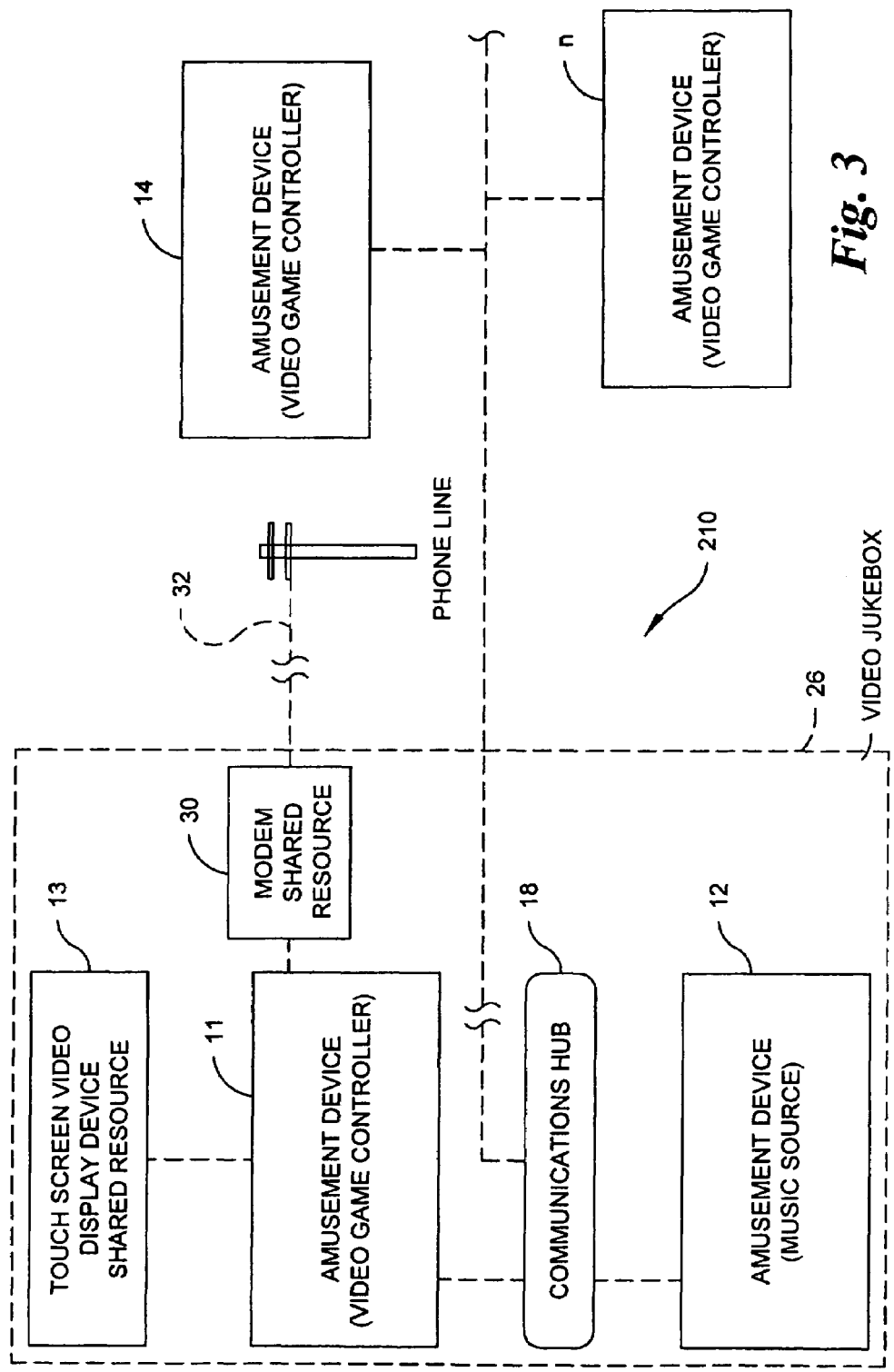
FIG. 3 is a block diagram of a third preferred embodiment of an amusement device shared resource system in accordance with the present invention.

FIG. 3 shows a third embodiment of an Amusement Device Shared Resource System 210. In the third embodiment, the first amusement device 11 (a video game controller) also includes a modem shared resource 30 which is directly connected thereto or embedded therein. Any of the amusement devices Nos. 2-n, in addition to the first amusement device 11, can access the modem shared resource through the communications platform and communications hub by using a terminal server application running on both controllers. For example, if the second amusement device 12 (the music source), requires access to a dial-up source to download additional music, the second amusement device 12 executes a terminal server application and becomes a master taking over the first amusement device 11 and then utilizes the modem shared resource 30 to access the dial-up source over the phone line 32. Accordingly, a single site having such an amusement device shared resource system 210 requires only one modem shared resource 30 for the entire network. Additionally, first amusement device 11 which is directly connected to the modem shared resource 30 does not have to have additional overhead and code other than the terminal serve application for the other amusement devices 12, 14 and n to access the modem shared resource 30.

Figure 6:
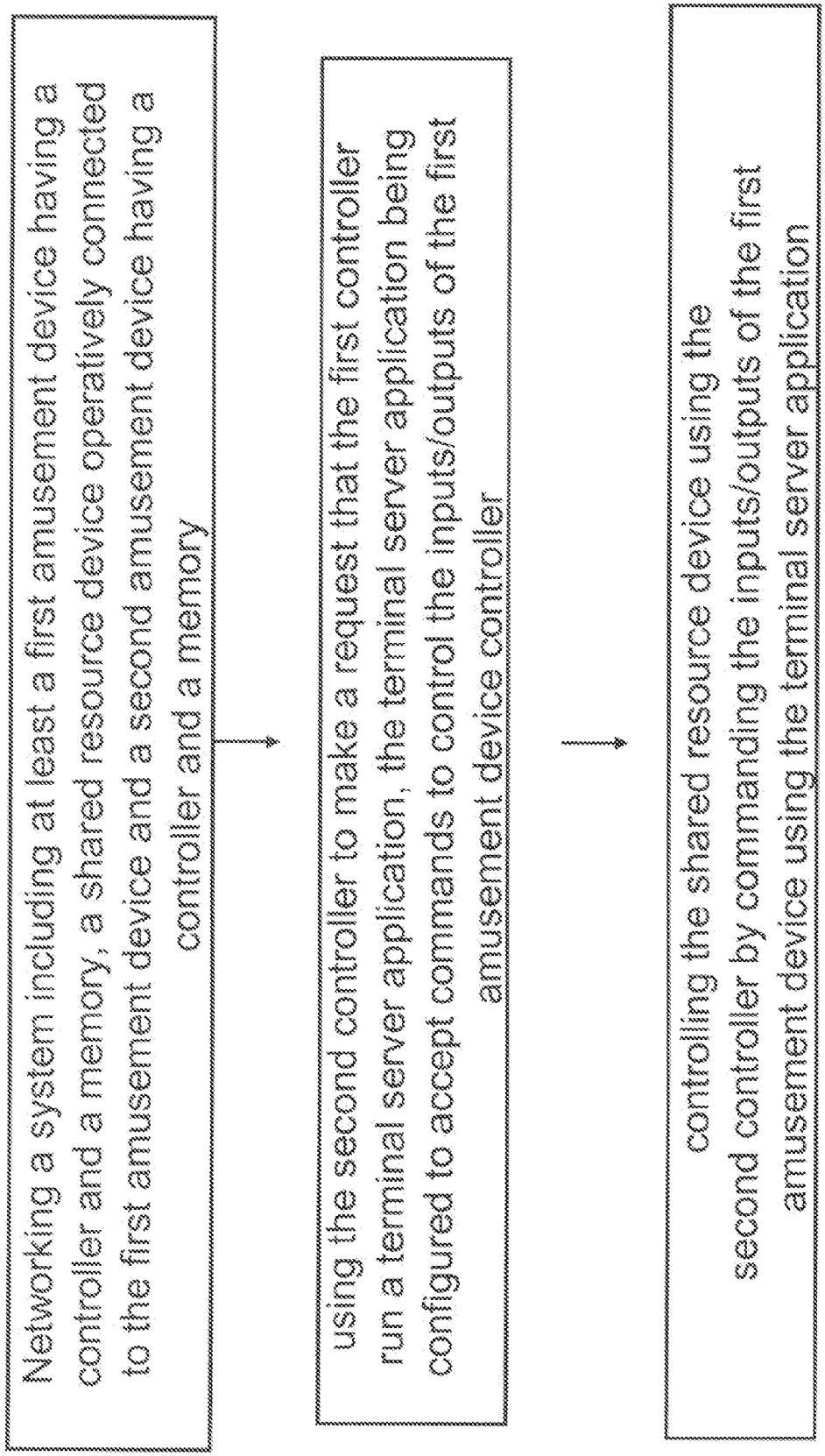
FIG. 6 is a flow diagram showing a method of controlling a shared resource in a networked system of amusement devices in accordance with the preferred embodiments of the present invention.

FIG. 6 is a flow diagram depicting a method of controlling a shared resource 13, 17, 30 in a networked system of amusement devices 11, 12, 14, 15, 16 in accordance with the preferred embodiments of the present invention.

From the foregoing it can be seen that the present invention comprises an amusement device shared resource system and method therefor. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An amusement device system comprising:
a first amusement device having a controller and a memory, the memory of the first amusement device including a plurality of games selectable for play by a user at the first amusement device;
a shared resource device operatively connected to the first amusement device;
a second amusement device having a controller and a memory, the second amusement device being in communication with the first amusement device, the second amusement device accessing the shared resource device through the first amusement device, the controller of the second amusement device contolling the shared resource device by commanding inputs/outputs of the controller of the first amusement device.

2. The amusement device system of claim 1, wherein the shared resource is at least one of a modem, a printer, a currency acceptor, a magnetic card reader, a video display, and an input device.

3. The amusement device system of claim 2, wherein the input device is one of a trackball, a mouse, a voice-recognition system, a touchscreen, a keypad and a keyboard.

4. The amusement device system of claim 1, further comprising an audio system operatively connected to one of the first and second amusement devices.

5. The amusement device system of claim 1, wherein the second amusement device communicates to the first amusement device using a local area network or a wide area network.

6. The amusement device system of claim 1, wherein the second amusement device communicates to the first amusement device using a wireless or a hardwired communication system.

7. The amusement device system of claim 1, wherein the second amusement device communicates to the first amusement device using a point to point connection.

8. The amusement device system of claim 1, wherein the controller of the first amusement device runs a terminal server application upon the request of the controller of the second amusement device, the terminal server application being configured to accept commands to control the inputs/outputs of the controller of the first amusement device.

9. The amusement device system of claim 1, further comprising:
a plurality of additional amusement devices each having a controller and a memory, each of the plurality of additional amusement devices being in communication with the first amusement device, each of the plurality of additional amusement devices accessing the shared resource device through the first amusement device, each controller of the plurality of additional amusement devices controlling the shared resource device by commanding input/outputs of the controller of the first amusement device.

10. An amusement device system comprising:
a first amusement device having a first housing, a first controller and a first memory, the first controller and the first memory being disposed in the first housing, the first memory including a plurality of games selectable for play by a user at the first amusement device;
a first shared resource device operatively connected to the first amusement device, the first shared resource device being disposed in the first housing;
a second amusement device having a second housing, a second controller, a second memory, and a user interface operatiyely connected to the second controller, the second controller and the second memory being disposed in the second housing, the second amusement device being in communication with the first amusement device, the second amusement device accessing the first shared resource device through the first amusement device, the second controller controlling the first shared resource device by commanding inputs/outputs of the first controller.

11. The amusement device system of claim 10, further comprising:
a third amusement device having a controller and a memory, the third amusement device being in communication with the first and second amusement devices, the third amusement device accessing the first shared resource device and the user interfece through the first and second amusement devices, respectively, individually or simultaneously, the controller of the third amusement device controlling the first shared resource device by commanding inputs/outputs of the controller of the first amusement device and controlling the user interface by commanding inputs/outputs of the controller of the second amusement device.

12. The amusement device system of claim 10, further comprising:
a plurality of additional amusement devices each having a controller and a memory, each of the plurality of additional amusement devices being in communication with the first and second amusement devices, each of the plurality of additional amusement devices accessing the first shared resource device and the user interface through the first and second amusement devices, respectively, individually or simultaneously, each controller of the plurality of additional amusement devices controlling the first shared resource device by commanding inputs/outputs of the controller of the first amusement device and controlling the user interface by commanding inputs/outputs of the controller of the second amusement device.

13. The amusement device system of claim 10, wherein the first amusement device accesses the user interface through the second amusement device, the first controller controlling the user interface by commanding the inputs/outputs of the second controller.

14. The amusement device system of claim 13, wherein the second amusement device accesses and controls the first shared resource device through the first amusement device while the first amusement device simultaneously accesses and controls the user interface through the second amusement device.

15. An amusement device system comprising:
a video game controller;
a touchscreen video display device operatively connected to the video game controller; and
a digital jukebox controller in communication with the video game controller, the digital jukebox controller accessing the touchscresn video display device through the video game controller, the digital jukebox controller controlling the touchscreen video display device by commanding inputs/outputs of the video game controller using a terminal server application.

* * * * *